(No Model.)

C. E. BECHTEL.
AIR SHIP.

No. 429,373. Patented June 3, 1890.

WITNESSES:
Donn Twitchell
C. Sedgwick

INVENTOR:
C. E. Bechtel
BY Munn & Co.
ATTORNEYS.

UNITED STATES PATENT OFFICE.

CHARLES E. BECHTEL, OF UDALL, KANSAS.

AIR-SHIP.

SPECIFICATION forming part of Letters Patent No. 429,373, dated June 3, 1890.

Application filed November 20, 1889. Serial No. 330,972. (No model.)

*To all whom it may concern:*

Be it known that I, CHARLES ELMER BECHTEL, of Udall, in the county of Cowley and State of Kansas, have invented a new and Improved Air-Ship, of which the following is a full, clear, and exact description.

My invention is an improvement in that class of mechanical aerial navigators which include two parallel pointed cylinders containing some buoyant medium, a means for propelling such cylinders, and lateral wings which are made adjustable on their transverse axes for the purpose of guiding the airship up or down, as hereinafter described and claimed.

Reference is to be had to the accompanying drawings, forming a part of this specification, in which similar figures of reference indicate corresponding parts in all the views.

Figure 1:
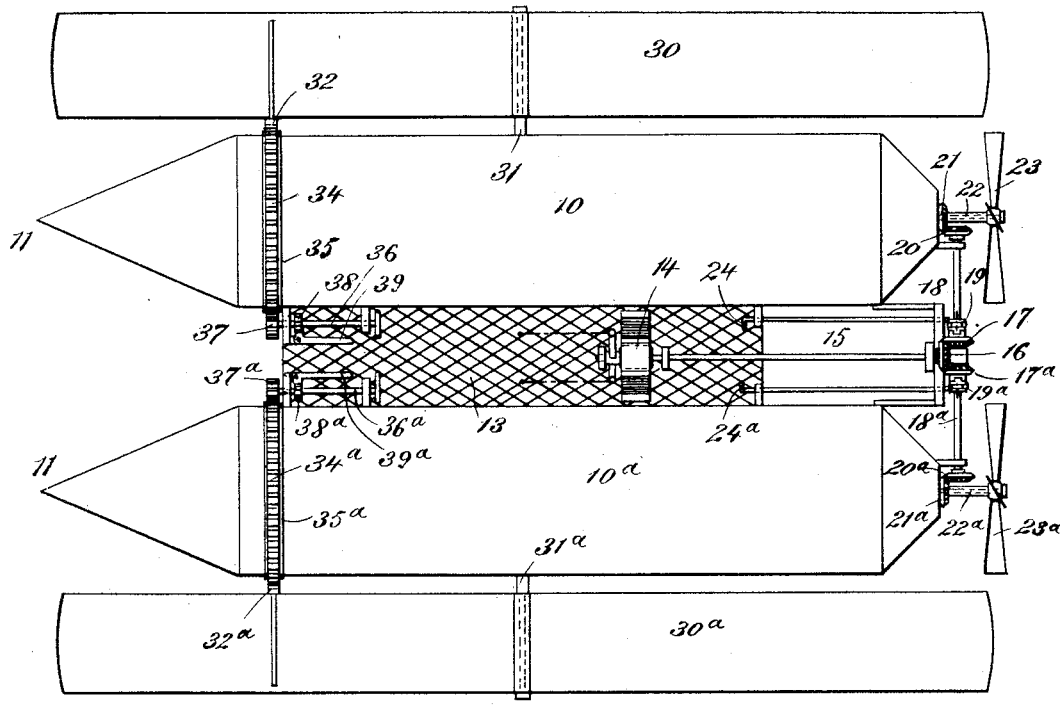
Figure 2:
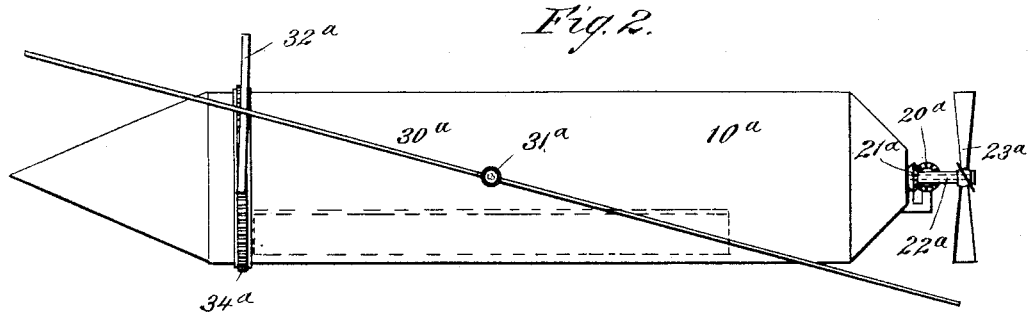
Figure 3:
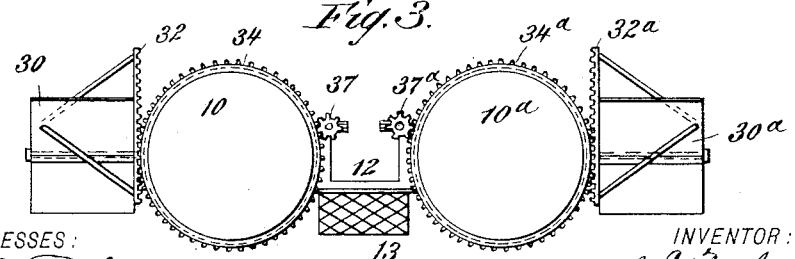

Figure 1 is a plan view of my improved airship. Fig. 2 is a side view of the same, and Fig. 3 is a front view thereof.

In the drawings, 10 and $10^a$ represent cylinders formed with pointed forward ends 11 and connected by a light frame 12, upon or beneath which there is stretched a light platform 13, preferably made of woven steel wire. The platform 13 supports an electric or other motor 14, which drives a shaft 15, said shaft 15 carrying a gear 16, that engages gears 17 and $17^a$, which are loosely mounted on lateral shafts 18 and $18^a$, clutches 19 and $19^a$, which ride on feathers formed on the shafts 18 and $18^a$, being arranged in connection with the gears 17 and $17^a$, whereby either one or both of the shafts 18 or $18^a$ may be rotated, as will be readily understood.

The shafts 18 and $18^a$ carry gears 20 and $20^a$, that engage corresponding gears 21 and $21^a$, carried by short shafts 22 and $22^a$, said shafts extending to the rear from the cylinders 10 and $10^a$ and carrying screws or propellers 23 and $23^a$. Shifting-levers 24 and $24^a$ are arranged in connection with the clutches 19 and $19^a$. To the outer sides of the cylinders there are connected wings 30 and $30^a$, said wings being pivotally mounted on horizontal shafts 31 and $31^a$. The wings 30 and $30^a$ carry racks 32 and $32^a$, which said racks are engaged by annular racks or gears 34 and $34^a$, that are mounted in proper guideways 35 and $35^a$, such guideways being carried by the cylinders 10 and $10^a$. In order that the annular racks or gears 34 and $34^a$ may be turned at will, I provide shafts 36 and $36^a$, which carry pinions 37 and $37^a$, such pinions engaging the annular racks or gears.

From the construction described it will be seen that within certain predetermined limits the wings 30 may be inclined at such angle to the horizontal line as may be desired, and in order that the wings may be held in the position to which they have been moved I provide the shafts 36 and $36^a$ with ratchets 38 and $38^a$, that are engaged by pawls 39 and $39^a$.

In operation the cylinders 10 and $10^a$ are inflated, not, however, sufficiently to overcome the attraction of gravitation, but almost to that point. Then if the ship is to be driven forward with and faster than the wind, or if the ship is to be driven against the wind, the shafts 36 and $36^a$ are turned so that the forward edges of the wings 30 and $30^a$ will be raised, as represented in Fig. 2. The motor is then started, and as the ship is driven ahead the resistance of the atmosphere acting upon the wings will carry the ship upward. On the other hand, if the vessel is to move with but slower than the wind, the rear edges of the wings would be moved upward. The vessel is steered to the right by throwing the operating-lever 24 so that the clutch 19 will be carried out of engagement with its gear 17, thus cutting out the screw or propeller 23, but leaving the connections of the screw or propeller $23^a$ such that the propeller will be revolved. To move the vessel to the left, the screw or propeller $23^a$ will be cut out and the connections of the screw or propeller 23 left intact.

By arranging the main structure of my airship or flying-machine after the style and fashion of a catamaran I secure a maximum amount of strength with a minimum amount of resistance, and also the advantage of direct propulsion.

Having thus described my invention, I claim as new and desire to secure by Letters Patent—

In an air-ship, the combination, with a pair of united cylinders and a means for propelling the same, of wings pivotally connected to the outer sides of the cylinders, racks carried by the wings, movable annular racks or gears carried by the cylinders and arranged to engage the wing-racks, and a means for turning the annular racks or gears, substantially as described.

CHARLES E. BECHTEL.

Witnesses:
P. WILLIS SMITH,
E. H. BARNHART.